United States Patent Office 3,137,725
Patented June 16, 1964

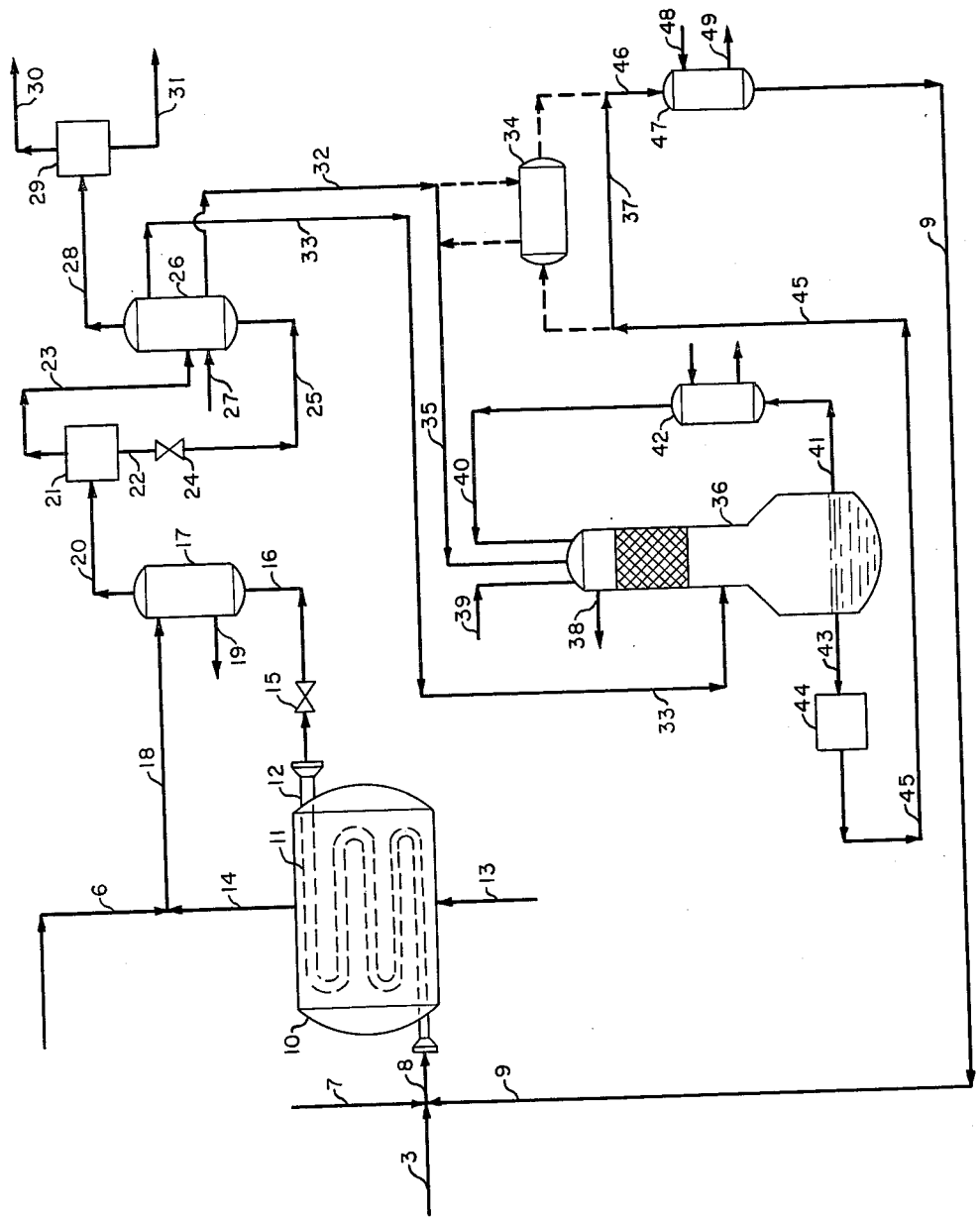

3,137,725
HEAT RECOVERY IN UREA SYNTHESIS PROCESS
Lucien H. Cook, Port Washington, and Thomas E. Gilbert, New York, N.Y., assignors to Chemical Construction Corporation, New York, N.Y., a corporation of Delaware
Filed Feb. 11, 1960, Ser. No. 8,009
5 Claims. (Cl. 260—555)

This invention relates to improvements in the manufacture of urea from ammonia and carbon dioxide whereby the synthesis product is urea, ammonium carbamate, ammonia and water and the ammonium carbamate is thereafter separated from the urea solution by thermal decomposition into constituent gases. A novel off-gas absorption and scrubbing system provides a reduction in process off-gas volume as well as significant improvement in heat economy. Furthermore, the present process also provides a novel method of providing heat required for the decomposition of ammonium carbamate remaining in the effluent urea solution from the synthesis reaction.

Urea is synthesized commercially by the reaction of ammonia with carbon dioxide at elevated pressure and temperature. Ammonium carbamate is formed as an intermediate compound, which upon loss of water yields urea. The reaction proceeds according to the following equations:

(1) 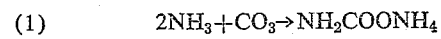 $2NH_3 + CO_2 \rightarrow NH_2COONH_4$ (2) 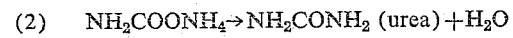 $NH_2COONH_4 \rightarrow NH_2CONH_2 \text{ (urea)} + H_2O$ Equation 1 shows the formation of the intermediate compound ammonium carbamate. This is a rapid reaction under the usual process conditions, and goes readily to completion. However, Equation 2, the dehydration of ammonium carbamate to yield urea and water, is a comparatively slow reaction under the usual process conditions, and does not readily go to completion in practice. Attempts have been made to improve the overall conversion by varying concentration of reactants and residence time. One commercial process utilizes a large excess of ammonia, and produces relatively high conversion of carbamate to urea. However, this procedure necessitates recycle of excess ammonia as well as recycle or decomposition of unconverted ammonium carbamate. Thus excess process units are required and heat consumption per unit of product is relatively high.

The processes of urea synthesis are also complicated by the severe corrosion conditions encountered. Corrosion by ammonium carbamate and urea is radically accelerated by relatively small temperature rises, especially at the reaction temperature of about 374° F. utilized in many urea synthesis processes, including the present invention. However, the rate of conversion of ammonium carbamate to urea is favored by elevated temperatures. Consequently, close control of temperature is a highly important factor in urea synthesis. The present process provides a new and improved system of temperature control, in which the inherent characteristics of the two reactions previously discussed are utilized to advantage in maintaining precise temperature levels and thus allowing operation close to the high temperatures at which severe corrosion occurs. Improved conversion of carbamate to urea is thereby accomplished, without the use of a large excess of ammonia.

It is an object of this invention to provide an improved process of urea synthesis. An additional object is to produce urea with a minimum concurrent production of off-gas, by means of an improved absorption and scrubbing system.

A further object is to accomplish the overall production of urea with improved heat recovery.

Another object is to provide a urea synthesis process which permits recycle of unconverted material in a more efficient and economical manner.

These and other objects will become apparent from the description which follows.

The process according to this invention may use only a slight excess of ammonia over the stoichiometric requirement, and attains a relatively lower overall carbamate to urea conversion of about 50% or above. Higher percent conversion is attained as the ratio of ammonia to carbon dioxide increases over the basic ratio of 2:1. Feed streams of ammonia and carbon dioxide in the desired ratio are introduced into the reactor and maintained at an elevated pressure between about 2000 p.s.i.g. and 4500 p.s.i.g. and temperature in the range of about 320° F. to 392° F. The effluent from the reactor contains urea, ammonium carbamate, ammonia and water. The carbamate is removed from the solution by thermal decomposition to ammonia and carbon dioxide at reduced pressure in two stages, the first at between 200 to 400 p.s.i.g. and the second at below 50 p.s.i.g. The ammonia and carbon dioxide off-gas stream produced from the first stage of carbamate decomposition is utilized as a heat source, by contacting the gas with a dilute aqueous solution such as aqueous ammonia in the shell of a heat exchanger, the tubes of which are the second stage of carbamate decomposition. The re-absorption of ammonia and carbon dioxide and consequent formation of ammonium carbamate produces heat which serves to aid the final carbamate decomposition. Additionally, the re-formed ammonium carbamate solution is then utilized together with an additional portion of dilute aqueous ammonia to scrub the unabsorbed gaseous portion of the off-gas stream at a relatively high pressure of approximately 200 to 400 p.s.i.g. Thus the volume of final off-gas stream is reduced with consequent increased process efficiency. The aqueous ammonium carbamate solution produced is recycled as previously described.

A preferred embodiment of the invention as practiced in a commercial installation will now be described. Referring to the figure, feed streams of liquid ammonia and carbon dioxide are passed into high pressure reactor 10 via lines 3 and 7 at a pressure of 3500 p.s.i.g. and temperatures of 59° F. and 50° F. (maximum) respectively. A molar feed ratio of 2.5 mols ammonia to 1 mol carbon dioxide is employed, thus providing a slight excess of ammonia over stoichiometric requirement. A recycle stream of aqueous ammonium carbamate is introduced into the reactor via line 9. The combined streams of ammonia, carbon dioxide, and recycle solution of ammonium carbamate may be delivered to reactor 10 via line 8 or optionally introduced separately into the inlet of line 11. Reactor 10 is a unit which provides a reaction interval with close temperature control, during which the conversion of a portion of the ammonium carbamate in stream 8 takes place. Temperature and reaction control is accomplished in two ways. High pressure pipe coils 11 are of varying diameter with smaller pipe first, followed by sections of increasing diameter, with the pipe of largest cross-section leading to vessel exit 12. Since pipe equivalent heat-transfer area per unit of contained volume is greater for small diameter pipe, heat removal from the process stream is accomplished at a greater rate in the smaller diameter pipe through which the process stream first passes on entering vessel 10. This is of advantage since the conversion of carbamate to urea is exothermic and consequently the greatest heat removal rate is required during the initial stages of conversion, before equilibrium is approached.

Another temperature control is achieved due to the fact that vessel 10 is in effect a form of steam boiler. Condensate is fed in via 13 and steam removed via 14.

Thus the level of condensate in vessel 10 may be varied to provide process temperature control. A higher condensate level would give a greater heat transfer rate, since more of the pipe would be transferring heat through a liquid condensate interface rather than a gaseous steam interface. The condensate level and steam pressure in line 14 are such that a temperature of about 374° F. is maintained in vessel 10, with about 100 p.s.i.g. steam being produced.

While the synthesis of urea is illustrated in the figure and described above as being carried out in a coil reactor, it is not contemplated that the synthesis need be restricted to this particular type of apparatus. It is quite feasible and within the scope of this invention to synthesize urea in a silver lined or stainless steel unobstructed autoclave similar to those commonly used in the urea industry.

The process stream leaves vessel 10 via exit 12 at 3500 p.s.i.g. and 374° F. This stream, now consisting of urea, ammonium carbamate, ammonia and water, is first passed through pressure reducing valve 15 whereby process stream pressure is reduced to 300 p.s.i.g. The stream now passes via line 16 to vessel 17, which is the first stage of a two-stage ammonium carbamate decomposition system. Vessel 17 is a steam-heated shell and tube heat exchanger with steam entering the shell via 18 and condensate leaving via 19. Steam sources are lines 6 and 14. However, the sole source of steam may be that which is introduced in line 6 when a conventional reactor is used for the urea synthesis. The process stream 16 passes through the tubes of vessel 17, and due to the application of heat and the reduced pressure of 300 p.s.i.g. a major portion of the ammonium carbamate present decomposes into ammonia and carbon dioxide. The resulting stream leaves via 20 and passes into decomposer separator 21.

The temperature of the process stream inside vessel 17 will depend on the particular operating pressure. Thus at 400 p.s.i.g. the stream temperature will be from about 275° F. to 300° F., while at 200 p.s.i.g. the stream temperature will be maintained from about 240° F. to 265° F. Lower temperature is feasible at the lower pressure since ammonium carbamate is more readily decomposed at a lower pressure.

Vessel 21 is a known type of liquid-gas separator, in which stream 20 is divided into a liquid stream 22 consisting principally of urea and water and a gas stream 23 containing excess ammonia plus ammonia and carbon dioxide derived from carbamate decomposition. The impure liquid product stream 22 is first passed through pressure reducing valve 24, whereby stream pressure is reduced to 15 p.s.i.g. Then the product stream passes via line 25 into the second stage ammonium carbamate decomposer vessel 26. Vessel 26 is similar in design and function to vessel 17 previously described. A novel feature of this invention is that heat is provided for the shell side of vessel 26 by contacting off-gas stream 23 with a dilute aqueous ammonia solution 27 within the shell of vessel 26. The temperature of the resulting liquid will be between about 250° F. to 350° F. Stream 27 is derived from a later stage of the process. The product stream leaves vessel 26 at a temperature of about 150° F. to 230° F. via 28, and passes into vessel 29 which is a liquid-gas separator of design and function similar to unit 21 previously described.

A final off-gas stream 30 is removed, containing ammonia, carbon dioxide and water vapor. Stream 30 may be passed to an ammonia recovery facility such as an associated ammonium nitrate plant, or may also be separated into components and recycled to the urea synthesis feed streams 3 and 7. The product urea solution, now free of ammonia and ammonium carbamate, is passed to storage via 31. The product solution may be commercially utilized in this form, or may be converted to a solid urea product by evaporative concentration followed by crystallization or prilling. Alternatively, the product solution may also be used in the production of urea nitrate by known processes. Other end-uses will occur to those skilled in the art.

Another novel feature of this invention is the treatment of the products of reaction in vessel 26. The reaction of streams 23 and 27, in addition to producing heat, also results in the formation of an aqueous ammonium carbamate solution stream and a non-condensed gas stream, which are thereafter removed via lines 32 and 33 respectively. The aqueous solution 32 may be first cooled by passing in heat exchange through recycle solution preheater 34, and then passed via line 35 to gas scrubber-absorber 36. However, in most cases no great advantage would be gained by using the heat exchanger 34. In the event there is no exchange of heat, the liquid being pumped to vessel 36 will pass through line 35 without any indirect contact with the liquid being pumped from vessel 36. Unit 36 is a packed gas-liquid scrubber of conventional design and serves to scrub out and recover most of the ammonia and carbon dioxide present in non-condensed gas stream 33. The final off-gas stream is removed via 38 and utilized in a manner similar to stream 30, previously described. Besides dilute ammonium carbamate solution stream 35, other liquid scrubbing solution components employed are a dilute aqueous ammonia stream 39 obtained in a manner to be described below, and a scrubbing solution recycle stream 40. The rich scrubbing solution collects in the base of vessel 36 and a portion is recycled via line 41, cooler 42 and line 40.

The balance of the rich scrubbing solution is drawn off via line 43, raised to urea synthesis operating pressure at 3500 p.s.i.g. via solution feed pump 44, passed via line 45 to recycle solution preheater 47, where it is warmed to the required operating temperature of 374° F., and finally passed via line 9 to recycle. In some instances it may be desirable to have the solution in line 45 pass through the heat exchanger 34 to pick up some heat from the solution flowing through line 32. Preheater 47 is a steam-heated heat exchanger, input steam line 48 may receive steam from lines 6 and 14 in a manner similar to steam feed line 18 previously described. Condensate is removed via 49.

Returning to urea solution product leaving via line 31, this solution is to be passed to a steam-heated storage tank, not shown on the figure. Off-gas from the tank, containing ammonia values, is scrubbed in an aspirator by a circulating dilute aqueous ammonia solution. Portion of this solution is drawn off and passed to the process via lines 27 and 39, as previously described.

The above discussion of a preferred embodiment of this invention is intended primarily for descriptive purposes, and should not be interpreted to limit or restrict the invention in any way.

Various modifications and alterations in the heat transfer and heat recovery systems, as well as known processing modifications found in the prior art, may be readily applied and utilized in conjunction with this invention.

This application is a continuation-in-part of application Serial No. 798,399 filed March 10, 1959, now abandoned.

We claim:
1. In the process of producing urea comprising reacting ammonia with carbon dioxide in at least the mol ratio of 2:1 at pressures in the range of 2000–4500 p.s.i.g. and at temperatures in the range of 320° F.–392° F. to form a solution containing urea, ammonium carbamate, ammonia and water, passing said solution to a high pressure carbamate decomposition being operated at pressures in the range of 200 to 400 p.s.i.g., and temperatures in the range of 240°–300° F., wherein a portion of the ammonium carbamate is decomposed to yield a gas phase comprising carbon dioxide and ammonia and a liquid phase, separating a gas phase from the liquid phase, passing said solution to a second carbamate decomposition step being operated at pressures below 50 p.s.i.g. and temperatures in the range of 150°–230° F., wherein substantially all the remaining ammonium carbamate is decomposed to carbon dioxide and ammonia, thereafter separately recovering the thus purified urea solution; the improvement in combination therewith which comprises absorbing the gas mixture derived from the high pressure decomposition of ammonium carbamate in an aqueous absorbent solution while in indirect heat exchange relationship with the ammonium carbamate being decomposed at a pressure below 50 p.s.i.g., thereby producing sufficient heat to decompose the ammonium carbamate at the lower pressure.

2. The method according to claim 1 in which the aqueous absorbent solution is water with ammonia dissolved therein.

3. In the process of producing urea comprising reacting ammonia with carbon dioxide in the mol ratio of at least 2:1 at pressures in the range of 2000–4500 p.s.i.g. and at temperatures in the range of 320°–392° F. in the presence of an ammonium carbamate solution to form a solution containing urea, ammonium carbamate, ammonia and water, passing said solution to a high pressure ammonium carbamate decomposition step which is operated in the pressure range of 200 to 400 p.s.i.g., and in the temperature range of 240°–300° F., wherein a portion of the ammonium carbamate is decomposed into carbon dioxide and ammonia, thereby forming a gas phase and a liquid phase, separating the gas phase from the liquid phase, decomposing the remaining ammonium carbamate in the liquid phase at a pressure below 50 p.s.i.g., and at a temperature in the range of 150°–230° F., forming an ammonium carbamate solution with the gases from the decomposition steps and returning said solution to urea synthesis; the improvement in combination therewith which comprises absorbing the gas mixture derived from the high pressure decomposition of ammonium carbamate in an aqueous absorbent solution while in indirect heat exchange relationship with the ammonium carbamate solution being decomposed at a pressure below 50 p.s.i.g., thereby producing sufficient heat to decompose the ammonium carbamate at the lower pressure.

4. The method according to claim 3 in which aqueous absorbent solution is water with ammonia dissolved therein.

5. The method according to claim 3 in which the improvement comprises withdrawing gaseous and liquid streams resulting from the heat generating reaction in the vessel used for low pressure decomposition, introducing the liquid product into an absorber above packing contained therein and introducing the gas product from said decomposer into said absorber below packing contained in said absorber, recirculating a predetermined amount of solution from the bottom of said absorber to a point above said packing and delivering the remainder of the solution from the bottom of said absorber to a compressor and thereafter to a heater wherein said solution is respectively compressed and heated to synthesis conditions and thereafter introducing said pressurized and heated solution into the urea synthesis reactor.

References Cited in the file of this patent

UNITED STATES PATENTS

| | | |
|---|---|---|
| 1,568,157 | Hess | Jan. 5, 1926 |
| 1,898,093 | Miller | Feb. 21, 1933 |
| 1,937,116 | Hetherington | Nov. 28, 1933 |
| 2,744,133 | Cramer | May 1, 1956 |
| 2,807,574 | Hirano et al. | Sept. 24, 1957 |
| 2,848,493 | Dewling et al. | Aug. 19, 1958 |
| 2,913,493 | Sze et al. | Nov. 17, 1959 |

FOREIGN PATENTS

| | | |
|---|---|---|
| 560,612 | Canada | July 22, 1958 |
| 958,503 | France | Mar. 13, 1950 |

OTHER REFERENCES

Parrish: Design and Working of Ammonia Stills (1924), page 168.

Kern: Process Heat Transfer (1950), pages 384–6.

Kirk-Othmer: Encyclopedia of Chemical Technology, vol. 5 (1950), pages 940–2.